United States Patent [19]
Burkhart et al.

[11] Patent Number: 5,859,169
[45] Date of Patent: Jan. 12, 1999

[54] URETHANE-MODIFIED NOVOLAKS FOR INCREASING THE STEEL CORD ADHESION AND RIGIDITY OF VULCANIZED RUBBER BLENDS

[75] Inventors: Thomas Burkhart, Walluf; Siegfried Wallenwein, Buettelborn; Gerhard Brindoepke, Sulzbach; Gerd Walz, Wiesbaden, all of Germany

[73] Assignee: Vianora Resins GmbH, Germany

[21] Appl. No.: 925,378

[22] Filed: Sep. 8, 1997

[30] Foreign Application Priority Data

Sep. 6, 1996 [DE] Germany ......................... 196 36 204.0

[51] Int. Cl.$^6$ ..................................................... C08G 08/04
[52] U.S. Cl. ........................... 528/129; 528/146; 528/159; 528/48; 528/75; 528/486; 528/493; 528/503; 525/123; 525/133; 525/134; 428/423.1; 428/413.9; 428/460
[58] Field of Search ..................... 528/129, 146, 528/159, 48, 75, 486, 493, 503; 525/123, 133, 134; 428/423.1, 423.9, 460

[56] References Cited

U.S. PATENT DOCUMENTS

| 4,148,769 | 4/1979 | Swarts et al. ............................. 260/25 |
| 5,089,589 | 2/1992 | Hesse et al. ............................. 528/129 |
| 5,426,152 | 6/1995 | Hesse et al. ............................. 525/139 |

FOREIGN PATENT DOCUMENTS

| 0440036 | 8/1991 | European Pat. Off. . |
| 0473948 | 3/1992 | European Pat. Off. . |
| 2254379 | 6/1976 | Germany . |
| 1448374 | 9/1976 | United Kingdom . |

*Primary Examiner*—Duc Truong
*Attorney, Agent, or Firm*—Connolly & Hutz

[57] ABSTRACT

Urethane-modified novolaks which are prepared by simultaneous reaction of a monohydric or polyhydric phenol (A) with an oxo compound (aldehyde or ketone) (B) and a urethane (C) in the presence of an acidic catalyst (D) at an elevated temperature of 60° to 200° C. and contain no interfering amounts of free starting phenol, and their use as adhesion improvers in rubbers, in particular rubbers containing reinforcing media such as steel cord or textile fibers.

22 Claims, No Drawings

URETHANE-MODIFIED NOVOLAKS FOR INCREASING THE STEEL CORD ADHESION AND RIGIDITY OF VULCANIZED RUBBER BLENDS

FIELD OF THE INVENTION

This invention relates to modified novolaks (hydroxyaromatic/oxo-compound reaction products) which, in vulcanized rubber blends, increase both the adhesion between the rubber and the strengthening medium (e.g. metallic cord or textile fiber) and the rigidity of the strengthening medium itself. An aspect of this invention relates to vulcanizable rubber blends containing the modified novolak and the resulting vulcanized rubber material, e.g. vulcanized rubber tires and other industrial reinforced rubber products. Still another aspect of this invention relates to a method for improving the adhesion between rubber and a strengthening medium.

DESCRIPTION OF THE PRIOR ART

Good adhesion of vulcanized rubber to brass-plated steel cord is of decisive importance for the long-term properties of steel radial tires. Most frequently used adhesion improvers (adhesion promoters) are based on so-called resorcinol novolaks (EP-A 0 440 036) or resorcinol (U.S. Pat. No. 4,148,769; DE-B 20 02 023) alone. Pure resorcinol is used only in combination with methylene donors, such as hexamethylenetetramine ("hexa") or hexamethoxymethyl melamine (HMMM) . The resins condensed in this manner increase the strengthening effect and improve the interfacial adhesion while at the same time providing increased rigidity of the rubber blend and improved wear resistance of the tread under a wide range of stress conditions. However, the use of resorcinol alone presents health and environmental protection problems because resorcinol may evaporate under the rubber processing conditions. In contrast to free resorcinol, resorcinol/formaldehyde condensates (resorcinol novolaks) release substantially less vapors and are used in combination with HMMM, although they are less effective for the adhesion than free resorcinol. At the same time, the stress values and especially the Shore A hardness of the strengthened rubber blends modified with such resorcinol novolaks are substantially less than those achieved when free resorcinol is used. Furthermore, owing to the strong natural color, resorcinol/formaldehyde condensates cannot be used in those rubber blends intended for applications in which a pale color of the vulcanized rubber is required.

The resorcinol/formaldehyde condensates used are products such as those which can be obtained, for example, by condensation of formaldehyde or formaldehyde donors with resorcinol or mixtures of resorcinol and a further phenol.

Resorcinol-free adhesion promoters which are based on functionalized melamine resins (EP-A 0 473 948) and which have a good adhesion-promoting action similar to that of free resorcinol or resorcinol novolaks are also available. However, rubber blends which contain such functionalized melamine resins vulcanize more slowly than those which contain HMMM/resorcinol systems. Furthermore, starting materials such as, for example, acrylamide, which are classed as carcinogenic, are used for the preparation of such functionalized melamine resins.

Accordingly, there is still a need for highly effective but environmentally friendly methods and agents for adhesion promoting effects in rubber blends, including rubber blends containing reinforcing media such as metallic cord and textile fiber, which methods and agents will not detract from vulcanization rates or from the properties of vulcanized rubber blends; for example, hardness values typically obtained from free resorcinol should be retained without polluting the environment or endangering the health of the persons involved in rubber production. The objectives of this invention relate to meeting these needs.

SUMMARY OF THE INVENTION

It has now surprisingly been found that the aforementioned objectives can be obtained if, in the rubber blends, the resorcinol is replaced by modified novolaks which have been prepared by reaction (preferably simultaneous reaction) of the components comprising a polyhydric phenol, an oxo compound (preferably an aldehyde or ketone) and a monomeric urethane compound in the presence of an acidic catalyst at elevated temperature; the resulting reaction product (sometimes referred to herein as a "resin") essentially lacks any amount of free starting phenolic compound which would interfere with its function as a modified novolak adhesion promoter or which would pose environmental problems during use (and processing) in rubber blends.

The invention results in the adhesion, hardness and tensile moduli of rubber blends prepared with resorcinol alone, without polluting the environment with toxicologically harmful materials. At the same time, pale rubber blends can be prepared with these new adhesion promoters, in contrast to resorcinol novolaks. The adhesion promoters according to the invention result in vulcanized rubber blends having improved adhesion to the reinforcing media (e.g. steel cord or textile fiber) and also increase the rigidity of these media.

The rubber blends prepared with the adhesion promoters according to the invention can be more readily and more advantageously processed in comparison with corresponding blends containing known resorcinol-based adhesion promoters.

Also very particularly surprising is that the adhesion improved according to the invention even increases after intensive action of moisture on the vulcanized rubber blends at relatively high temperatures, in contrast to comparable vulcanized systems.

The invention therefore relates to urethane-modified novolaks (urethane-modified novolak "resins") which are prepared by reaction (preferably simultaneous reaction) of the components comprising: (A) a monohydric or polyhydric phenol, (B) an oxo compound (aldehyde or ketone) and (C) a monomeric urethane compound, in the presence of (D) an acidic catalyst at an elevated temperature of about 60° to about 200° C., preferably about 70° to about 180° C., which urethane-modified novolaks contain essentially no interfering amounts of free starting phenol. These novolaks act, according to the invention, as adhesion promoters and adhesion improvers.

DETAILED DESCRIPTION

The urethane-modified novolaks of this invention are well-suited for use in vulcanizable rubber blends which contain the usual vulcanizing agents, curing agents, fillers and conventional additives in addition to the aforementioned modified novolaks.

Broadly speaking, the interaction of a phenolic compound with an aldehyde or other oxo compound and/or a modifier can be carried out by known methods, as described, for example, in DE-C 22 54 379. The pre-formed urethane (C) can be added before or during the reaction. Thus, the interaction of the three principal components in the presence of the acid catalyst is "simultaneous" in the sense that no staging of the reaction or formation of intermediates is required, although the urethane (C) can be added to components (A) and (B) before or during the condensation reaction. One or more organic liquids of low volatility (e.g. with a boiling point above 60° C.) which are inert toward the reaction components (e.g. liquid aromatic compounds free of active hydrogen and oxo-containing substituents) can be included in the reaction mixture as solvent or diluent or viscosity-reducing media. Minor amounts of such liquids can be sufficient.

Thus, the reaction medium which produces a urethane-modified novolak of this invention is generally a novolak-forming (condensation) and novolak-modifying reaction mixture, unless the entire urethane forming component (the urea or urea derivative C', see below) is pre-reacted with the phenolic component (A), in which case the condensation reaction directly forms a urethane-modified novolak from the pre-reacted components (A) and (C') and the oxo compound (B). It is preferred to react all three components (A) through (C) simultaneously in the same reaction medium, component (C) optionally being added after the reaction between components (A) and (B) is underway.

In principle, all phenolic compounds (A) which have at least one reactive hydrogen atom on the aromatic nucleus and at least one phenolic hydroxyl group and are thus at least monofunctional in their reactivity with aldehydes are suitable for the preparation of the modified novolaks used according to the invention. These include mononuclear or polynuclear phenolic compounds which can be monofunctional, difunctional or trifunctional or have a higher functionality in their reactivity with oxo compounds, for example, formaldehyde. The hydrogen atoms reactive toward oxo compounds, such as aldehydes and ketones, are those which are in the ortho or para position on an aromatic nucleus relative to a hydroxyl group or another substituent with +I and/or +M effect.

Suitable phenols are mononuclear and polynuclear hydroxyaromatics which are optionally substituted by linear, branched or cyclic alkyl groups having 1 to about 20 carbon atoms, oxyalkyl groups substituted by such alkyl radicals or halogen atoms, at least one reactive hydrogen atom being bonded to one of the aromatic nuclei. The phenols can be used individually or as a mixture. Phenol itself, the various cresol and xylenol isomers (e.g. o- and p-cresol, 2,4- and 2,6-xylenol), the isomers of ethylphenol, of propylphenol or of isopropylphenol and p- or o-substituted alkylphenols having up to about 18, in particular up to about 15, carbon atoms in the side chain are particularly preferred. Less preferred but still suitable phenolic compounds include phenols substituted by olefinically unsaturated groups, such as, for example, o- or p-vinylphenol or p-isopropenylphenol, and phenolic substances reacted with dicyclopentadiene (DCPD) and/or styrene and/or colophony.

Thus, one class of particularly preferred phenolic compounds has the formula $Ar(R)_n(OH)_m$, where Ar is a polycyclic or, preferably, a monocyclic aromatic ring, R is $C_{1-C15}$-aliphatic, preferably alkyl, n is a number from 0 to 2, preferably 0 or 1, and m is a number from 1 to 3, preferably 1 or 2, most preferably 1.

Polynuclear monohydric phenols, such as the isomeric hydroxynaphthalenes, which may optionally be substituted as described above, and mononuclear polyhydric phenols, such as pyrocatechol, resorcinol, hydroquinone, pyrogallol and phloroglucinol, are also suitable.

Other suitable phenolic compounds include polynuclear polyhydric phenols such as, for example, isomers of diphenylolmethane, diphenylolethane, diphenylolpropane (bisphenol A) and bishydroxyaryl compounds in which the aromatic structures are linked by a direct bond or an ethenyl, ether, carbonyl, sulfonyl, carbonyloxy or carboxamido group, such as dihydroxybiphenyl, dihydroxystilbene, dihydroxydiphenyl ether, dihydroxybenzophenone, dihydroxydiphenyl sulfone, dihydroxyphenyl benzoate and dihydroxybenzanilide, which are optionally substituted by alkyl or alkoxy groups or halogen atoms as described above. Other polyhydric, polynuclear phenols, such as, for example, the isomeric dihydroxynaphthalenes and also trihydric and polyhydric hydroxyaromatics can also be used.

Suitable oxo compounds (B) are in principle all compounds which contain aldehyde and/or ketone groups or can generate compounds having such groups (as in the case of, for example, trioxane, paraldehyde, formaldehyde polymers, or the like) and which are reactive toward phenols having reactive hydrogen atoms on the aromatic ring and are capable of forming condensates with them. Among the oxo compounds which can be used as starting components and which can be employed individually or as a plurality in succession or as a mixture, linear or branched aliphatic aldehydes, such as formaldehyde, acetaldehyde and their homologs or isomers having 1 to 18 carbon atoms per molecule, in particular up to 12 carbon atoms per molecule; thus, the most preferred oxo compounds are aldehydes of the formula R' CHO, where R' is H or a $C_{1-C18}$-aliphatic group, especially alkyl. The use of aqueous formaldehyde solutions (which can include polymerized formaldehyde and usually contain mass fractions of 1 to 50%, more typically 25 to 45% of formaldehyde) is particularly preferred. Ketones having 3 to 18, preferably up to 12, carbon atoms may also be used. For example, acetone, methyl ethyl ketone, diethyl ketone and camphor are preferred.

In particular, reaction products of urea or urea derivatives (both referred to as C') with alcohols are used as "urethanes" (C); the term "urethane" being understood to refer to (monomeric) esters of carbamic acid, i.e compounds which contain the linkage —NH—CO—O—.

"Urea derivatives" are understood here as meaning alkyland arylureas as well as biuret and semicarbazide, which contain at least one substituted amido group. Suitable alcohols are linear and branched aliphatic, cycloaliphatic and alkylaromatic alcohols having 1 to 20 carbon atoms, for example lower ($C_{1-C10}$) aliphatic alcohols, such as methyl alcohol, ethyl alcohol, the various propyl alcohols, butyl alcohols, pentyl alcohols and hexyl alcohols, heptyl alcohol, octyl alcohol, nonyl alcohol and decyl alcohol, and unsaturated alcohols, such as allyl alcohol, cycloaliphatic alcohols, such as cyclopentanol and cyclohexanol, alkylaromatic alcohols, such as benzyl alcohol, methyl glycol and other monoethers of glycols, such as ethylene glycol monoethyl ether and ethylene glycol monobutyl ether.

Furthermore, dihydric, trihydric or polyhydric linear, branched or cyclic aliphatic alcohols having 2 to about 20 carbon atoms may also be used in addition to the monohydric alcohols. Polysaccharide or, preferably, monosaccharide sugar alcohols, which, together with the polyhydric alcohols, such as, for example, pentaerythritol, form part of the polyol group and are useful in this invention. The alcohols, regardless of whether aliphatic, cycloaliphatic or alkylaromatic, also include those in which the OH group is not fixed on a terminal carbon atom but on a middle carbon atom (secondary) or branching point (tertiary). The secondary aliphatic alcohols include, for example, 2-butanol and 2-propanol; the tertiary aliphatic alcohols include, for example, 2-methyl-2-propanol (tert. butanol). The alcohols which can be used also include the group comprising the enols (olefinically unsaturated alcohols), the acyloins, aminoalcohols, for example the alkanolamines, and the hydroxycarboxylic acids, which can form intramolecular esters.

Suitable urea components (C') for the abovementioned reaction, in addition to urea itself, are also derivatives of urea, such as, for example, semicarbazide as well as substituted, particularly N-alkylated, ureas, such as, for example, methyl- and ethylurea. The amide-like derivatives of organic acids with urea, the so-called ureides, such as, for example, acetylurea, can also be used.

The urea or urea derivatives (C') used for the preparation of the urethanes can also be reacted directly with all or at least a part of the phenolic compounds (A). This less preferred variant is a two-stage reaction, where between 5 and 90% of the phenolic compound (A) is reacted with the urea or urea derivative (C'), as defined hereinabove, in the first stage, and the rest of component (A) and component (B) are added for the second stage of the reaction.

The group comprising the suitable urethanes also includes the direct reaction products of isocyanic esters and aryl isocyanates with monohydric alcohols such as, for example, N-phenylurethane, a reaction product of phenyl isocyanate with ethanol. Suitable isocyanic esters and aryl isocyanates are alkyl mono-, di- and polyisocyanates having 1 to about 20 carbon atoms in the alkyl or aryl radical. Suitable monoisocyanates are n-propyl and isopropyl isocyanate, butyl isocyanate, octyl isocyanate, octadecyl isocyanate and cyclohexyl isocyanate; phenyl isocyanate, 1-naphthyl isocyanate, o-, m- and p-tolyl isocyanate and benzyl isocyanate. Suitable di- and polyisocyanates are, for example, tetra- and hexamethylene diisocyanate, 2,2,4- and 2,4,4-trimethylhexane 1,6-diisocyanate, isophorone diisocyanate, toluylene diisocyanate and the allophanates, uretdiones and isocyanurates which are derived from these isocyanates. The urethane group also includes the reaction products of chloroformic acid esters (e.g.alkyl chloroformiates) with ammonia.

All of these "urethane"-forming components, whether mono- or poly-functional, are reacted to form an essentially monomeric material rather than a polymer or prepolymer. Thus, compounds having a multitude of repeating units or a molar mass of, say, 300 g/mol or more, e.g. polyoxyalkylene diols or triols are not needed and not preferred as active hydrogen-containing coreactants in the formation of "urethane" component (C) for the modified novolak. Relatively simple compounds such as alkyl- or alkylarylurethanes (alkyl- or alkylarylcarbamates) having 1 to about 20 carbon atoms in the radical derived from the alcohol (preferably lower alkyl carbamates) can serve as the complete "urethane" component (C) ; chain formation, chain extension, and crosslinking that are common in the chemistry of polyurethanes are not required for the component (C) starting material which reacts with components (A) and (B) to form the modified novolak.

Any of the components (A) through (C) can include non-hydrocarbon substituents which are essentially inert toward the novolak-forming and novolak-modifying reactions which take place in the reaction medium.

The composition of the modified novolaks used according to the invention as adhesion promoters can be varied within a wide range. The ratio of the amounts of substance of their components (A) phenol to (B) aldehyde is about 1:0.3 to about 1:0.95, in particular about 1:0.5 to about 1:0.9 mol/mol and the ratio of the amounts of substance of (A) phenol to (C) urethane is about 1:005 to about 1:1, in particular about 1:0.03 to about 1:0.2 mol/mol.

Particularly preferred components are the aforementioned classes of phenolic and oxo compounds, $Ar(R)_n(OH)_m$ and R'CHO, and a lower alkyl carbamate, especially the components phenol, formaldehyde, and butyl carbamate (butylurethane).

For the further characterization of the urethane-modified novolak resins which can be used according to the invention as adhesion promoters, the components and conditions for making the modified novolaks are selected to provide them with a melting point, a viscosity of their solutions in a suitable organic solvent, and a hydroxyl number of the resin which are preferably in the ranges which are typical for novolak adhesion promoters. Preferably used modified novolak resins are those which are present in solid, finely divided form under normal conditions. The melting point is preferably at least high enough so that the products do not cake during storage at room temperature and during transportation. Preferred modified novolaks according to the invention contain mass fractions of less than about 0.5%, preferably less than about 0.1%, particularly preferably less than about 0.01%, of free phenolic compounds of component (A), based on the mass of the novolak.

Although the interaction of components (A) through (C) in the presence of the acidic catalyst (D) is sufficient to produce a urethane-modified novolak resin of this invention, additional components can be included. One class of such additional components, hereafter referred to as component (E), comprises natural and/or synthetic unsubstituted hydrocarbons or their derivatives having about 4 to about 40 carbon atoms and having one or more carbon-carbon double bonds, in the latter case also having conjugated double bonds; suitable hydrocarbon derivatives can have, for example, carboxylic, ester, amide, or hydroxyl substituents. Component (E) compounds can participate in the condensation of the phenolic compounds with oxo compounds and the urethane. Among other compounds which can be used are unsaturated fatty acids, fatty oils (glyceryl esters of fatty acids), fatty amides and fatty alcohols—all of which can contain the roughly 4 to 40 carbon chain referred to above. Furthermore, suitable starting compounds include hydrocarbon resins and resin acids which can be obtained or derived from natural sources, e.g. polyterpenes and other terpene-based unsaturated natural substances or colophony. Hydrocarbon compounds which can be used are alkenes, dienes or even more highly ethylenically unsaturated aliphatic and aromatic hydrocarbons. For example, vinylaromatics, in particular styrene, are particularly suitable. When one or more additives (E) are present, their mass fraction ranges from about 2 to about 40%, preferably about 5 to about 25%, based on the mass of the novolak modified in this manner and obtained from the starting materials (A), (B), (C) and (E).

The novolaks according to the invention are generally prepared in the presence of an acidic catalysts (D), the presence of the catalyst being provided by either the conventional technique (e.g. as disclosed in DE-A 22 54 379) or by the circulation technique (see U.S. Pat. No. 5,089,589). Preferably used acidic catalysts are strong mineral acids and/or their acidic derivatives having a $PK_a$ of less than 5, in particular sulfuric acid, hydrogen sulfates, in particular of alkali metals or ammonium, phosphoric acid, and hydrochloric acid; half-esters of sulfuric acid with aliphatic alcohols having 1 to 20 carbon atoms; organic acids, such as the sulfonic acids (including halogenated sulfonic acids such a trifluoromethane sulfonic acid), such as the alkanesulfonic and arylsulfonic acids having 1 to 20 carbon atoms, in particular p-toluenesulfonic acid, and the aliphatic monobasic and dibasic carboxylic acids having 1 to 20 carbon atoms, preferably the stronger carboxylic (having a $pK_a$ of less than 5) such as oxalic acid (preferably oxalic acid dihydrate) and the halogenated lower aliphatic carboxylic acids, especially halogenated $C_1$-carboxylic acids such as chloroacetic, dichloroacetic acid, trichloroacetic acid and the corresponding fluorinated $C_1$-carboxylic acids such as trifluoroacetic acid. The strong mineral acids and the organic sulfonic and sulfuric acids preferably have a $pK_a$ of less than about 2, typically of less than 1; the strongest of these acids can therefore provide a pH of 1 or less in very modest concentrations (e.g. 0.1N) Lewis acids, such as aluminum trichloride, zinc chloride and tin chloride and boron trifluoride and its etherates, are also suitable.

The adhesion promoters according to the invention can be used in all known vulcanizable rubber blends which contain natural rubber or synthetic rubbery polymers (elastomers), e.g. the rubbery polymers typically used to make vehicle tires, and conventional additives, including conventional vulcanizing agents. Sulfur and sulfur-donating compounds, which can introduce crosslinks between polymer chains, are among the most commonly-used vulcanizing agents.

Suitable preferred types of rubber which can be vulcanized with sulfur are, for example, natural rubber, polyisoprene, polybutadiene, styrene/butadiene rubber, acrylonitrile rubber, butyl rubber, ethylene/propylene/diene terpolymer rubber (EPDM rubber) or their mixtures, as usually used in the vehicle tire industry or for the production of industrial rubber goods. Typical further conventional components include, for example, fillers, such as carbon blacks, silicas, chalk or kaolins, and inorganic or organic pigments, such as titanium dioxide, iron oxide or phthalocyanine dyes. In addition to the vulcanizing agent, still further conventional components include, for example, vulcanization auxiliaries, such as, for example, accelerators and activators. Examples of other conventional additives include long-chain fatty acids (e.g. stearic acid), zinc oxide, antiaging agents, tackifiers and also metal compounds for additionally improving the adhesion of rubber to steel cord, for example salts of cobalt or of nickel with monobasic carboxylic acids, preferably naphthenic acids or isooctanoic acid. For improving the processing, the addition of mineral oils and plasticizers, for example, phthalic esters, is also conventional.

The modified novolak resins used according to the invention can be cured by the addition of conventional curing agents such as, for example, hexamethylenetetramine, or of methylene donors, for example in the form of melamine resins of suitable composition. The melamine resins can be used as such in the form of crystalline or liquid products or, preferably, as advantageously processable, free-flowing products after their prior adsorption onto suitable solid carriers.

The adhesion promoters according to the invention are used in vulcanizable rubber blends which can be prepared in the usual manner, for example in internal mixers or on mixing rolls. It may be advantageous to increase the mixing temperature during any desired mixing phase to a value above the melting range of the added adhesion promoter resin, for better distribution of the adhesion promoters according to the invention. It is also important that the curing agents be incorporated as far as possible only at the end of the mixing process at temperatures which are not too high (about 80 to about 100 ° C.), in order to avoid a premature reaction with the crosslinkable resin components.

In addition, the choice of components and the establishment of their mass fractions in the vulcanizable rubber blends may be based on known criteria. The mixing of the components at higher temperatures can also be carried out in a known manner, for example at about 100 to about 160 ° C., inter alia, for example, in conventional heatable internal mixers or on conventional heatable mixing rolls. The vulcanization of the rubber blends, too, can be carried out in a known manner at conventional temperatures in conventional heatable apparatuses, optionally under pressure.

The mass fraction of the adhesion promoters according to the invention in the vulcanizable rubber blends may be preferably up to about 20%, in particular up to about 15%, particularly preferably about 0.5 to 10%, based on the mass of the vulcanizable rubber blend. In general, one can employ other known adhesion promoters, such as, for example, resorcinol, provided that they do not give rise to or display any disadvantageous or harmful defects.

As is known in the art, virtually any component of or additive to a rubber blend can be introduced by the masterbatch technique, whereby the mass fraction (percentage) of component or additive in the masterbatch is considerably higher (e.g. 10 to 95% based on the mass of the masterbatch) than in the resulting rubber blend. Thus, it is consistent with this invention to formulate masterbatches of urethane-modified novolak resin containing mass fractions of 5 to 75% of rubber, the balance being essentially the modified novolak, although small amounts of other desired ingredients can be included in the same masterbatch.

The vulcanizable rubber blends which contain the adhesion improvers according to the invention and can be prepared, processed and vulcanized by known methods are very suitable for the production of industrial rubber articles, preferably of those which contain metallic or fibrous strengthening or reinforcing media based on metallic (particularly steel) cord or textile fiber. They can be used in particular for the production of tubes, drive belts, seals strengthened by reinforcing media, conveyor belts and vehicle tires, since they have both outstanding adhesion properties on the stated reinforcing media and a hardness or rigidity which is surprisingly high compared with the conventional adhesion promoters.

The invention is described in more detail by the non-limiting working Examples and the Comparative Examples set forth below. In these Examples, "pbw" denotes parts by weight (parts by mass) and data in percent are generally mass fractions, based on the mass of the mixture, unless stated otherwise.

EXAMPLE 1

Preparation of a modified novolak

A 2 liter 4-necked glass flask provided with thermostatic heating, stirring apparatus, thermometer, feed apparatus and reflux condenser with water separator is used for the condensation reaction and the working up of the reaction mixture. The water separator has a siphon which is adjustable in height and permits continuous separation of the water.

640 pbw of phenol, 128 pbw of butyl carbamate, 146 pbw of xylene and 6 pbw of para-toluenesulfonic acid are introduced into the reactor; the mixture is heated to 130 ° C. After this temperature has been reached, 442 pbw of a 37% strength aqueous formaldehyde solution are added dropwise from a metering vessel in the course of 4.5 hours. During the feed, the temperature of the mixture increases to 150° C.

After refluxing for 5 hours, 375 pbw of an aqueous phase have separated off in the water separator, which phase contains less than 1% of formaldehyde.

6 pbw of triethanolamine are then added to the batch; the solvent is distilled off over the descending condenser, initially under atmospheric pressure, until a bottom temperature of 200° C. has been reached. During the process, the flask is flushed with nitrogen as an inert gas. After 200° C. has been reached, a steam distillation is carried out for 30 minutes at the reduced pressure generated by a waterjet pump, in order to remove the phenol which has not reacted. Reduced pressure (30 mbar=3 kPa) is then applied again for 30 minutes at 200° C. The distillation residue is then cooled. 750 g of a pale yellow resin which has a softening point of 46° C. and, as a 50% strength solution in methoxypropanol, a viscosity of 400 mpa·s at 23° C., are obtained. The mass fraction of free phenol in the resin is less than 0.5%.

EXAMPLE 2

The modified novolak prepared according to Example 1 is tested for its effects in a vulcanizable rubber blend. For this purpose, a base rubber blend 1 is prepared at about 150° C. by thorough mixing of the individual components. In each case appropriate amounts of this base rubber blend 1 are taken and are mixed, in a second mixing stage 2 at temperatures above 100° C., with the addition promoter to be tested, after which the sulfur, the accelerator and the curing agent are added as follows in a third mixing stage 3 at temperatures below 100° C.:

Base rubber blend 1 consisting of:
100 pbw of natural rubber
60 pbw of carbon black
5 pbw of active silica
5 pbw of zinc oxide
1 pbw of stearic acid
1 pbw of antiaging agent Mixing stage 2:
172 pbw of base rubber blend 1 are initially taken in each case; in each case 2.5 pbw of adhesion promoter resin from Example 1 (=Example 2.1) or resorcinol novolak (=comparative example 2.2 not according to the invention) or conventional free resorcinol (=comparative example 2.3 not according to the invention) are mixed in at a temperature of 130° C.

Mixing stage 3:
174.5 pbw of rubber blend of mixing stage 2 are initially taken in each case and in each case
5.0 pbw of sulfur
0.8 pbw of benzothiazyl-2-tert-butylsulfenamide
2.5 pbw of melamine resin, liquid 100% strength
are mixed in at a temperature of 90° C.

Table 1 gives an overview of the behavior of the respective blend on mixing in the adhesion promoters in mixing stage 2 and on subsequent mixing in mixing stage 3 and during the subsequent vulcanization of the vulcanizable blend obtained in each case from mixing stage 3 in the course of 45 minutes at 145° C. in a test specimen mold. The following properties of the vulcanizates obtained as test specimens from the vulcanization are tested by the methods customary in practice:

a)- Tensile strength and elongation at break according to DIN 53504
b)- Tensile moduli at 10%, 25% and 50% elongation according to DIN 53 504
c)- Testing of Shore A hardness according to DIN 53 505
d)- Tear-out force and coverage in the steel cord adhesion test.

Table 2 shows the summarized results.

The results of the steel cord adhesion tests are important; in this test, steel cord which has the construction 2+2×0.25 mm and in which the brass layer has a copper content of about 63% is embedded in the vulcanizable rubber blend in special vulcanization molds by a conventional method and the blend is then vulcanized therein. The vulcanized test specimens are then stored for 3 days at 90° C. and 100% relative humidity (r.h.) and for 7 days at 90° C. at 100% relative humidity (r.h.).

The force required for tearing out the steel cords from the vulcanized rubber blend is then measured and the coverage of the steel cord is stated. This is understood as meaning the area of wire covered with rubber on the pull-out cord, which area is estimated in steps of 10% and rated by numerical values from 1 to 10. The ratings 1 to 10 consequently denote 10 to 100% covered wire area. The results in Table 2 are mean values of measurements of ten individual tests in each case.

The measured values in Table 2 clearly reveal that a higher tear-out force and a higher coverage are achieved with the vulcanized rubber blend according to the invention from Example 2.1 than with the comparative system, containing resorcinol, of comparative example 2.3 or with the resorcinol novolak of comparative example 2.2.

Furthermore, hardness and tensile moduli are substantially better than in the case of the resorcinol novolak and reach virtually those of comparative example 2.3. In addition, the example according to the invention gives rise to virtually no annoyance of the persons involved as a result of smoke development or odor during the processing and also virtually no pollution of the environment by toxic material.

TABLE 1

Observations during preparation of mixing stages 2 and 3 and during the vulcanization

| Tests | Example 2.1 (Radiation promoter according to Example 1) | Comparative Example 2.2 (Resorcinol novolak) | Comparative Example 2.3 (Resorcinol) |
| --- | --- | --- | --- |
| Smoke development: | none | none | very pronounced |
| Odor: | of rubber | of rubber | strong odor of resorcinol |

TABLE 2

Tests on the vulcanizates

| Tests on the vulcanizates | | Example 2.1 (Adhesion promoter according to Example 1) | Comparative Example 2.2 (Resorcinol novolak) | Comparative Example 2.3 (Resorcinol) |
|---|---|---|---|---|
| Tensile strength | (MPa) | 25 | 24 | 23 |
| Elongation at break | (%) | 381 | 360 | 328 |
| Tensile modulus at 10% elongation | (MPa) | 1.4 | 0.9 | 1.5 |
| Tensile modulus at 25% elongation | (MPa) | 2.0 | 1.5 | 2.2 |
| Tensile modulus at 50% elongation | (MPa) | 3.0 | 2.5 | 3.3 |
| Shore A hardness | | 85 | 78 | 87 |
| Steel cord adhesion: | | | | |
| Force/coverage | (N/cm)/rating | 327/9 | 251/9 | 220/8 |
| after storage for: | 3 days at 90°C. and 100% r.h. | 297/9 | 245/8 | 153/3 |
| | 7 days at 90°C. and 100% r.h. | | | |

What is claimed is:

1. A urethane-modified novolak which is prepared by a simultaneous reaction of components comprising:
   A. a monohydric or polyhydric phenol,
   B. an oxo compound and
   C. a monomeric urethane, in the presence of (D) an acidic catalyst at an elevated temperature of about 60° to about 200° C. and which contains no interfering amounts of free starting phenol.

2. A urethane-modified novolak comprising reaction product of components comprising:
   A. a phenolic compound,
   B. an oxo compound and
   C. a monomeric urethane, in the presence of (D) an acidic catalyst at an elevated temperature in a range of about 60° to about 200 ° C., the urethane-modified novolak being essentially free of unreacted component (A).

3. The urethane-modified novolak as claimed in claim 2, wherein the phenolic compound or compounds of component (A) have at least one reactive hydrogen atom on the aromatic nucleus and at least one phenolic hydroxyl group.

4. The urethane-modified novolak as claimed in claim 3, wherein the component (A) comprises a compound of the formula $Ar(R)_n(OH)_m$, wherein
   Ar is a monocyclic aromatic ring,
   R is a $C_{1-C15}$-alkyl group,
   n is a number from 0 to 2, and
   m is 1 or 2,
   and wherein component (B) comprises a compound of the formula R'CHO, wherein R' is H or $C_1$–$C_{18}$-alkyl.

5. The urethane-modified novolak as claimed in claim 4, wherein component (B) comprises formaldehyde.

6. The urethane-modified novolak as claimed in claim 5, wherein component (B) comprises an aqueous solution containing formaldehyde.

7. The urethane-modified novolak as claimed in claim 2, wherein component (C) comprises an alkyl- or alkylarylurethane having 1 to 20 carbon atoms in the radical derived from the alcohol.

8. A urethane-modified novolak comprising a reaction product of components comprising:
   A. a phenolic compound,
   B. an oxo compound and
   C. a monomeric urethane comprising a carbamic acid ester of a dihydric or polyhydric alcohol having 2 to 20 carbon atoms, in the presence of (D) an acidic catalyst at a temperature of about 60° to about 200° C., the urethane-modified novolak being essentially free of unreacted component (A).

9. The urethane-modified novolak as claimed in claim 2, wherein component (C) comprises a reaction product of the components comprising substituted or unsubstituted urea and an alcohol.

10. The urethane-modified novolak as claimed in claim 2, wherein component (C) comprises a reaction products of the components comprising an alkyl, cycloalkyl, or aryl isocyanate and an alcohol.

11. The urethane-modified novolak as claimed in claim 2, wherein component (A) comprises phenol, component (B) comprises formaldehyde, and component (C) comprises butylurethane.

12. The urethane-modified novolak as claimed in claim 2, wherein the mass ratio of the amounts of components (A) and (B) is about 1:0.3 to about 1:0.95.

13. The urethane-modified novolak as claimed in claim 2, wherein the mass ratio of the amounts of components (A) and (C) is about 1:0.005 to about 1:1.

14. The urethane-modified novolak as claimed in claim 2, comprising the reaction product of the components (A), (B), (C), and (E), wherein component (E) is a natural or synthetic or natural and synthetic unsaturated hydrocarbon having about 4 to about 40 carbon atoms and one or more optionally conjugated carbon-carbon double bonds, an unsaturated fatty acid having about 4 to about 40 carbon atoms or an ester or amide thereof, a fatty alcohol having about 4 to about 40 carbon atoms, or a hydrocarbon resin or hydrocarbon resin acid.

15. The urethane-modified novolak as claimed in claim 14, wherein the mass fraction of the interacted component (E) in said reaction product ranges from about 2 to about 40%.

16. The urethane-modified novolak as claimed in claim 2, wherein component (E) comprises styrene.

17. The urethane-modified novolak as claimed in claim 2, wherein acidic catalyst (D) is one or more of the following acids: a mineral acid having a $pK_a$ < about 2, an organic sulfonic acid having 1 to about 20 carbon atoms, a half-ester of sulfuric acid with an aliphatic alcohol having 1 to about 8 carbon atoms, a halogenated lower aliphatic carboxylic acid, oxalic acid, or a Lewis acid.

18. A rubber composition comprising a rubber and the urethane-modified novolak as claimed in claim 2.

19. A rubber composition as claimed in claim 18, wherein said rubber composition is vulcanizable and contains a vulcanizing agent.

20. A rubber product comprising a rubber composition of claim 18, which has been vulcanized, and a fibrous or metallic reinforcing medium, wherein adhesion between the rubber and the reinforcing medium is promoted by said urethane-modified novolak.

21. A rubber product as claimed in claim 20, wherein said product is a vehicle tire.

22. A method for promoting adhesion between a vulcanizable rubber composition and a fibrous or metallic reinforcing medium, comprising the step of introducing into the vulcanizable rubber composition the urethane-modified novolak of claim 2.

* * * * *

UNITED STATES PATENT AND TRADEMARK OFFICE
CERTIFICATE OF CORRECTION

PATENT NO. : 5,859,169
DATED : January 12, 1999
INVENTOR(S) : Thomas Burkhart ET AL.

It is certified that error appears in the above-identified patent and that said Letters Patent is hereby corrected as shown below:

Cover Page, [73] Assignee Data, change "Vianora" 'to -- Vianova--.

Cover Page, [56] References Cited, FOREIGN PATENT DOCUMENTS, add -- 2002023 7/71 Germany --.

Cover Page, [56] References Cited, add
-- OTHER PUBLICATIONS

Chemical Abstracts, Vo.. 113, No. 10, Abstract No. 80642, "Manufacture of Carbamate Modified Phenolic Resins for Flexible Coatings" (9/3/90) --.

Claim 2, line 1 (col. 11, line 29), after "comprising" add -- a --.

Claim 4, line 5 (col. 11, line 47), change "$C_{1-C15}$-allyl group" to -- $C_1$-$C_{15}$-allyl group --

Signed and Sealed this

Twentieth Day of July, 1999

Attest:

Q. TODD DICKINSON

*Attesting Officer*  *Acting Commissioner of Patents and Trademarks*